Jan. 15, 1952     J. K. REED     2,582,914

VEHICLE VENTILATING DEVICE

Filed Dec. 11, 1950

INVENTOR.
JOHN K. REED

BY Edward M. Apple

ATTORNEY

Patented Jan. 15, 1952

2,582,914

UNITED STATES PATENT OFFICE 2,582,914

VEHICLE VENTILATING DEVICE

John Kenneth Reed, Charlevoix, Mich.

Application December 11, 1950, Serial No. 200,241

5 Claims. (Cl. 296—44)

This invention relates to automobile accessories and has particular reference to a device for stopping the whistle and noise of rushing air caused at high speed travel, when the ventilating wing or pivoted window panel of the automobile is open.

An object of the invention is to eliminate the noise of rushing air and to improve the ventilation of the interior of the vehicle body when a ventilator is open.

Another object of the invention is to provide a device which will control the outward flow of air from a vehicle body when a ventilator is open and a vehicle is traveling at a high rate of speed.

The foregoing and other objects and advantages of the invention will become more apparent as the description proceeds, reference being made from time to time to the accompanying drawings, forming part of the within disclosure, in which drawings.

Figure 1:
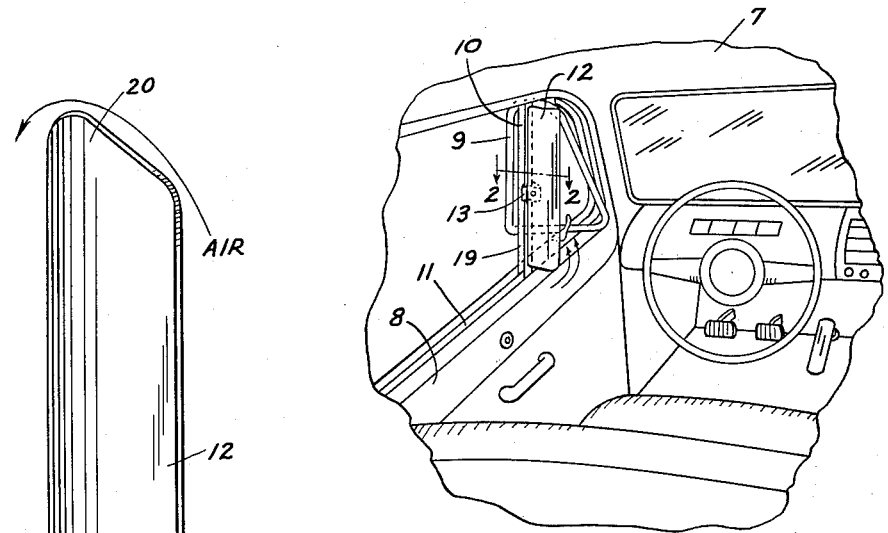
Fig. 1 is a fragmentary perspective of the interior of an automobile from which the device embodying the invention is mounted.

Referring now more particularly to the drawings, it will be understood that in the embodiment herein disclosed, the reference character 7 generally indicates an automobile body having a door 8 and a conventional pivotable window panel or ventilator 9, which is shown in Fig. 1 as being in an open position. A division bar or mullion 10 separates the ventilator 9 from the principal pane of glass 11 of the door. The door glass 11 is shown in lowered position in Fig. 1, although it will be understood that the glass 11 will be in elevated position to effect the best results with the use of the device embodying the invention.

The parts just described are conventional parts of an automobile and form no part of the invention except as combined with the elements which I will now describe:

My improved ventilating accessory consists of a length of transparent plastic material 12, which is substantially of the same length as the mullion 10, to which it is secured by means of a V-shaped spring clip 13, the latter being riveted, as at 14, to the member 12. The spring clip 13 has bent and rebent terminal portions 15 and 16 which are adapted to clamp around the rolled edges 17 and 18 of the mullion 10. The metal comprising the spring clip 13 is of such thickness as not to interfere with the raising and lowering of the window 11, the leading edge of which travels in the channel 19 of the mullion.

Figure 3:
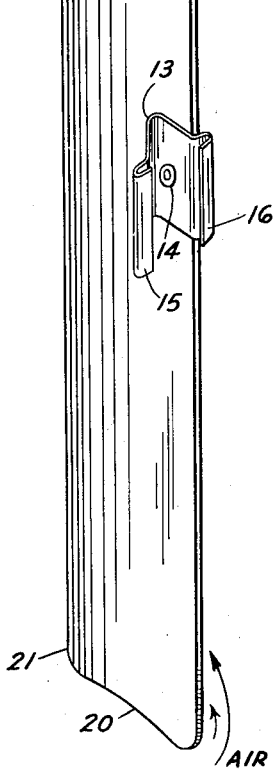
Fig. 3 is an enlarged perspective view of the device embodying the invention.
Figure 2:
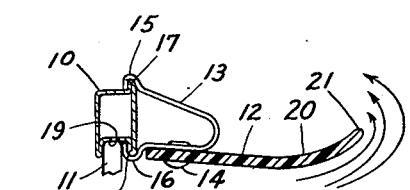
Fig. 2 is a section taken on the line 2—2 of Fig. 1, with the sealing gaskets between the mullion and the ventilator and the mullion and the window panel removed.

The plastic member 12 is substantially flat throughout the greater part of its length and width, but has a slight radius formed adjacent its leading edge as shown in Figs. 2 and 3. The device may be used on either side of the vehicle by simply inverting it.

When the device is positioned on the left-hand door of the vehicle as shown in Figs. 1 and 2, the clip 13 engages the inside edges of the mullion 10, so that the member 12 is directed toward the interior of the automobile and along the radius 20 curves slightly toward the front of the vehicle as shown in Figs. 1 and 2. When so installed and the automobile is traveling at a high rate of speed with the ventilator 9 open as shown in Fig. 1, the air from the interior of the vehicle body will be drawn outwardly by reason of the vacuum created along the trailing edge of the ventilator 9 by the air outside of the vehicle being deflected outwardly by the ventilator 9. The air being drawn outwardly from the interior of the vehicle will assume a path substantially as shown by the directional arrows in Figs. 1 and 2 and will describe a comparatively wide arc as it passes the leading edge 21 of the member 12. The stream of air which passes around the leading edge 21 of the member 12 is comparatively wide and its velocity is somewhat reduced because of the comparatively wide turn which it is forced to take by the member 12 as compared to the short turn it would normally take around the edge 17 of the mullion 11 when the invention device is not employed.

I have discovered that it is the comparatively thin air stream being drawn outwardly at high velocity and being bent sharply around the edge 17 of the mullion 10 which causes the whistling and disturbing noises at the ventilator opening when the vehicle is traveling at high speed. These noises are reduced to a minimum or are entirely eliminated by the use of my device.

Having described my invention what I claim and desire to secure by Letters Patent is:

1. A device of the character described for use with a vehicle body having a ventilator window pivoted on a vertical axis and a mullion in back thereof, comprising a sheet of transparent material of substantially the same length as said mullion, said sheet of material being substantially flat throughout its length and width except for a slight radius formed adjacent the leading edge thereof, said sheet being directed toward the front of the vehicle and means for attaching said sheet of plastic material to said mullion.

2. The structure defined in claim 1, in which said last named means consists of a V-shaped spring clip having inturned terminal portions adapted to engage opposite edges of said mullion.

3. A device of the character described for use on the mullion of an automobile at the rear of a ventilator window which is pivoted on a vertical axis, comprising a sheet of plastic material of substantially the same length as said mullion, said sheet of material being directed toward the interior of said automobile and having a portion thereof curved toward the front of said automobile, there being means on said sheet of material for attaching the same to said mullion.

4. The structure defined in claim 3, in which said last named means comprises a substantially V-shaped spring clip having inwardly directed terminal edges arranged to engage opposite edges of said mullion.

5. A device of the character described for use in back of a vehicle ventilator window, which is pivoted on a vertical axis in combination, a substantially rectangular sheet of transparent plastic material, there being a slight radius formed in said sheet adjacent one side thereof, and a spring clip secured at the opposite side thereof intermediate the ends, said clip having terminal portions arranged to engage a window mullion, said sheet of plastic material being directed toward the interior of the vehicle and the side of said sheet having the radius being directed toward the front of the vehicle.

JOHN KENNETH REED.

REFERENCES CITED

The following references are of record in the file of this patent:

UNITED STATES PATENTS

| Number | Name | Date |
|---|---|---|
| 1,849,176 | De Fries | Mar. 15, 1932 |
| 2,290,449 | Ramsey | July 21, 1942 |
| 2,465,345 | Elsebusch | Mar. 29, 1949 |
| 2,519,446 | Elsebusch | Aug. 22, 1950 |

FOREIGN PATENTS

| Number | Country | Date |
|---|---|---|
| 479,785 | Great Britain | Feb. 11, 1938 |